May 30, 1967 — E. S. LOWLEY — 3,321,989
SPEED-REDUCTION GEAR-BOXES
Filed Aug. 17, 1964 — 3 Sheets-Sheet 1
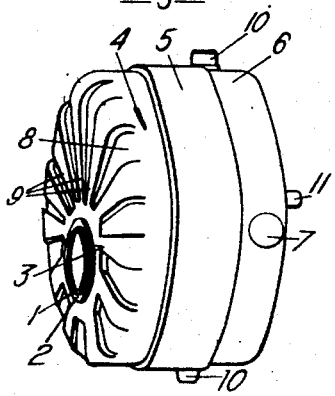
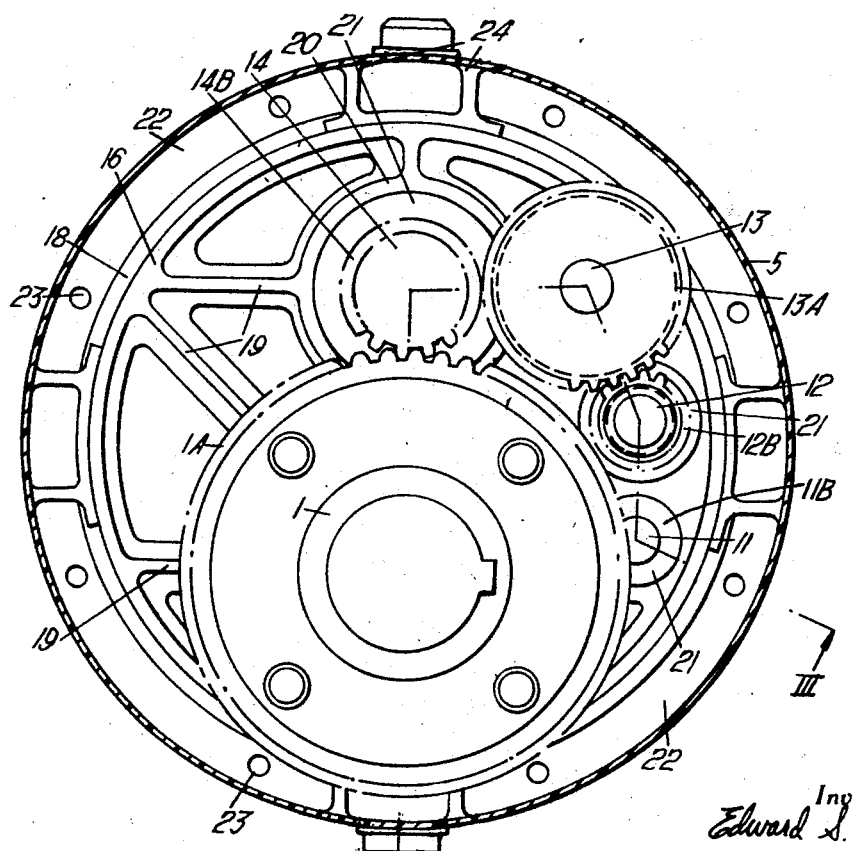

May 30, 1967 E. S. LOWLEY 3,321,989
SPEED-REDUCTION GEAR-BOXES
Filed Aug. 17, 1964 3 Sheets-Sheet 2
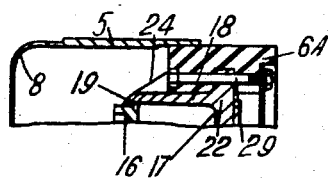
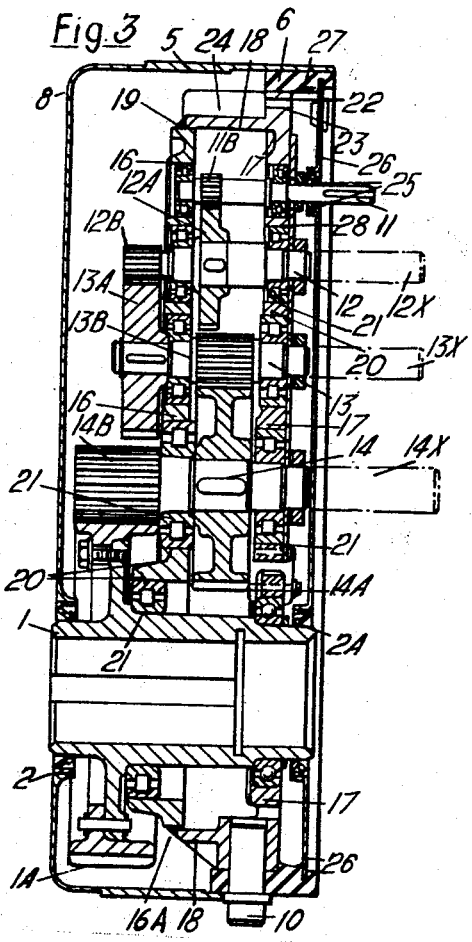
Inventor
Edward S. Lowley
By
Watson, Cole, Grindle & Watson
Attorneys May 30, 1967  E. S. LOWLEY  3,321,989
SPEED-REDUCTION GEAR-BOXES
Filed Aug. 17, 1964  3 Sheets-Sheet 3
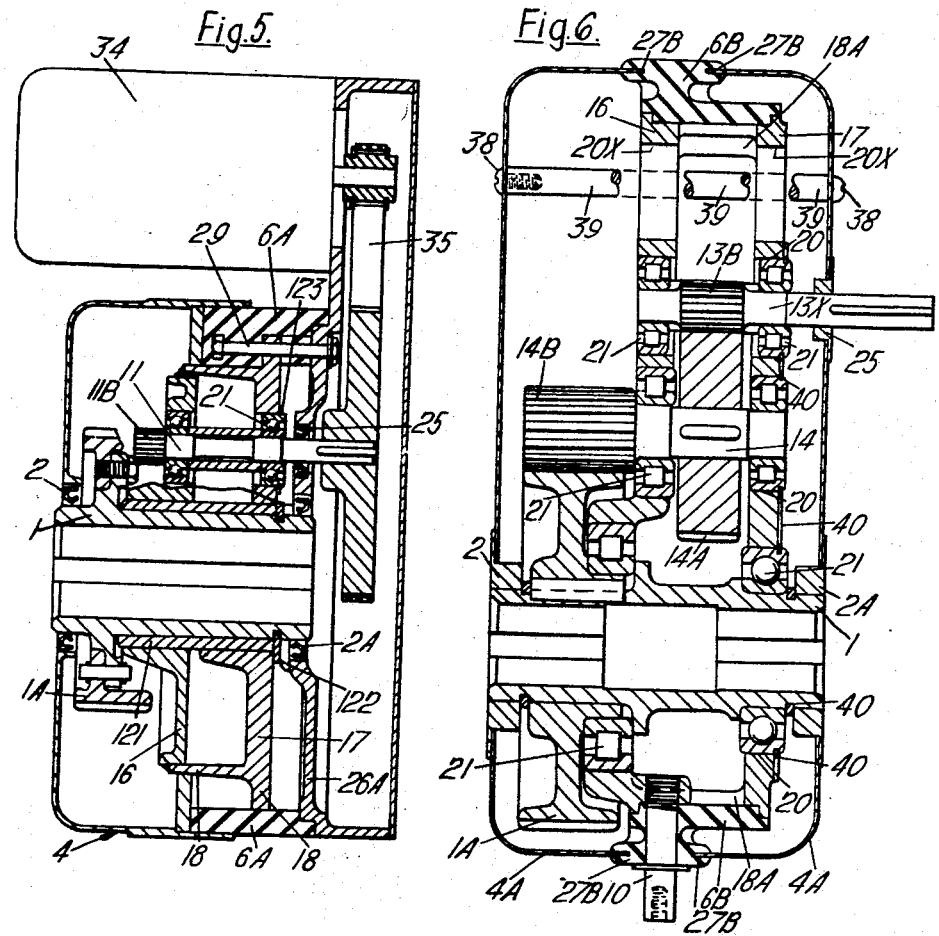

United States Patent Office 3,321,989
Patented May 30, 1967

3,321,989
SPEED-REDUCTION GEAR-BOXES
Edward S. Lowley, Sheffield, England, assignor to Aurora Gearing Company (Wilmot North) Limited
Filed Aug. 17, 1964, Ser. No. 390,091
Claims priority, application Great Britain, Aug. 24, 1963, 33,615/63
5 Claims. (Cl. 74—443)

This invention relates to speed-reduction gear-boxes of the type providing for direct application via an output sleeve to a shaft to be driven, and having an input shaft parallel to the output sleeve and in geared connection with it. Such a gear-box, providing a predetermined ratio of speed-reduction (or a selection of predetermined ratios by varying the ratio of any one or more of the pairs of intermeshing gears making up the total reduction sequence) is commonly used as a unit for application to and support by a shaft to be driven, to be driven itself from a parallel shaft, usually that of a driving motor, by belt or chain connection to the input shaft, with the gear-box capable of being anchored against the tendency to rotation about the axis of the shaft to be driven. Adjustability of the anchoring means permits the tension of the driving connection to the input shaft to be regulated. Thus, the gear-box may be anchored by a torque-arm of adjustable length and operating under tension.

However, the usual construction of such a gear-box consists essentially of a two-part metal housing, which not only serves to enclose all the gears but contains the housings for the bearings of all the shafts to which the gears are secured. The two parts of the housing must therefore be of substantial, rigid character, and accordingly they are usually castings. Because they are also large enough to enclose the gears, they are bulky and relatively heavy. Moreover, they are directly subjected to the vibrations arising from the gear-box when in use. As a consequence, the advantage that the input can be provided by a high-speed low-torque source of power is accompanied by the considerable disadvantage that the high-pitched noise generated by the use of parts operating at high speed is transmitted directly by the housing to the surrounding space.

The like disadvantages as to bulky, heavy housings and noise arise also with speed-reduction gear-boxes not intended to be supported by the driven shaft but provided with a base flange or a side flange for direct mounting to a pedestal or casing associated with the shaft to be driven.

One object of the present invention is to provide a speed-reduction gear-box in which the output sleeve and the shafts to which the gears are secured are mounted in a compact frame, independently of any enclosing housing, the frame being strong yet light, and enabling short stiff shafts to be used, with considerable advantage in minimising the generation of noise at its source, i.e., at the intermeshing teeth of the gears secured to the shafts.

Another object is to provide a gear-box with a compact frame as above indicated that is adaptable without modification to shaft-mounting and to flange-mounting, the latter particularly in connection with direct motor-drive.

Yet another object is to provide a gear-box as above indicated with enclosing means to minimise the transmission of noise, but without adding materially to the weight or bulk of the gear-box.

Further objects and advantages, including the provision of a frame capable of being simply and accurately machined, the addition of an in-built selective additional change of speed-reduction ratio, and the addition of in-built reversing means, will appear from the subsequent description.

According to the present invention, a speed-reduction gear-box of the type referred to comprises a centre frame having parallel walls bored transversely, with parallel axes, to provide bearing housings for the output sleeve and for at least two other shafts, with substantially equal spacing between their axes and the axis of the sleeve, any one of which shafts may serve as an input shaft, there being alternately between the walls of the frame and externally of either wall pairs of intermeshing gears, one external gear of one pair being on the sleeve and the other being a meshing pinion on one of the shafts, and there being on that shaft one gear of an internal pair, the other being a meshing pinion on another of the shafts, thus providing at least two stages of speed-reduction in series, as well as a single stage of speed-reduction by use as the input shaft the shaft on which is the external pinion meshing with the pinion on the output sleeve.

The parallel walls of the frame can be closely spaced, because they have to be separated by no more than is necessary for the reception of the tooth width of the internal gears, or of whatever happens to be the greater tooth width where there is more than one pair of internal gears. The close spacing of the walls allows them to be connected by a narrow periphery of the frame. This minimises the weight of the whole frame and permits the economical use of alloy steel, conveniently in cast form.

Although the frame may be a single casting, it is advantageous for it to be fabricated from two castings, one including one wall and the periphery, the other being the other wall, the two castings preferably being welded together around the periphery of the wall casting.

One wall of the frame can be provided with bolt-holes, for use of the wall for flange-mounting of the frame and its sleeve, shafts, and gears.

For shaft-mounting of the gear-box, at least one anchor connection is provided on the frame. This enables the frame to be connected by a torque arm to any convenient point.

For applications where noise should be minimised, the box is provided with at least one dished cover, fitted round and extending from the periphery of the frame. Preferably, the periphery of the frame is surrounded by a resilient moulding, e.g., of rubber, which provides the support for the dished cover, without transmitting noise from the frame to the cover.

Advantageously, moulded fibre glass or other plastic-based sound-deadening material is used for the cover or covers. Such material is also of advantage if the gear-box is to be used in a corrosive atmosphere, as in a chemical plant.

If a single deep dished cover is used for one side of the gear-box, a flat plate cover may suffice for the other side of the box.

A covered box is advantageous when the material of the gears is such as to need lubrication. By the provision of oil seals where the output sleeve and the input shaft emerge through the cover, the covered box can contain a supply of lubricant. However, gears of nylon or other plastic material may be used without lubrication.

The disposition of the axes of the two or more gear-carrying shafts at substantially the same distance from the axis of the output sleeve enables the sleeve and the shafts, and the gears carried by them, to be accommodated in a frame with a circular periphery. This facilitates the machining of the periphery to receive a correspondingly circular resilient moulding.

The resilient moulding may extend beyond one wall of the frame, to provide for sound-deadening when the gear-box is flange-mounted.

Two embodiments of the invention will now be described in greater detail, and some modifications in detail applicable to both embodiments, with reference to the accompanying drawings, in which:

FIGURE 1 is a perspective view of a gear-box, complete with cover, intended for mounting on a shaft;

FIGURE 2 is a side elevation of a four-stage box;

FIGURE 3 is a section, developed on the irregular line III—III of FIGURE 2, of the four-stage box;

FIGURE 4 is a fragmentary view of an alternative detail of the box of FIGURE 3;

FIGURE 5 shows a box as in FIGURES 2 and 3 in a further operative shaft mounted position;

FIGURE 6 is a developed section of a modified box, with two covers, providing for three stages of reduction.

In FIGURE 1, one end of an output sleeve 1, surrounded by an oil seal 2, is seen protruding through an aperture 3 in a dished cover 4 of a shaft-mounted gear-box. A cylindrical wall 5 of the cover 4 grips round the periphery of a resilient moulding 6, fitted with a snap-in plug 7 for the supply of oil to the gear-box, this also serving as an oil-level plug or drain plug. The plug may have a hole to enable it to serve as a breather plug. The dished end 8 of the cover 4 has generally radiating ribs 9 to stiffen it, when the end 8 can be of thinner material than the wall 5. A reinforced fibre glass moulding is preferred for the cover 4, so as to minimise sound-transmission, aided by its mounting on the moulding 6. Projections 10 through the moulding 6 provide connectors for anchoring the gear-box against rotation about the axis of the sleeve 1.

At the right-hand side of FIGURE 1 can be seen an input shaft 11, the location of which with respect to the axis of the output sleeve 1 appears in FIGURE 2, the shaft 11 being the most remote of a series of shafts 11, 12, 13, 14 from the sleeve 1, "remote" being in the sense of the length of a gear train through which the sleeve 1 is ultimately driven. The shaft 11 carries a pinion 11B meshing with a gear 12A (FIGURE 3) on the shaft 12; similarly, the shaft 12 carries a pinion 12B meshing with a gear 13A on the shaft 13; the shaft 13 a pinion 13B meshing with a gear 14A on the shaft 14; and the shaft 14 a pinion 14B meshing with a gear 1A on the sleeve 1. The reductions shown at all the stages are 1:5, so that if the shaft 11 is used for the input, the total reduction to the sleeve 1 is 1:625. The stage reductions need not, however, be by equal ratios and alternative ratios may be provided at any one suitable stage.

Because of the progressive speed reductions, the torque is progressively higher in the order 11, 12, 13, 14, 1, and the pinions and gears are progressively stronger and greater in diameter in that order, with tooth sizes appropriate to the torque. The diminishing diameters of the gears 14A, 13A, 12A, in that order, enables the sleeve, the shafts, and the gears to be connected within a circular space, with the radial distances of the shafts from the axis of the sleeve not exactly equal, but of a similar order of length, so that the shafts and their gears form a compact cluster with respect to the sleeve.

This compact clustering appears in FIGURE 2, which is a view of the gear-box of FIGURE 1 as seen from the left, with the dished end 8 of the cover 4 removed. The meshing gear pairs 12B, 13A and 14B, 1A are external to one circular wall 16 of a frame, the other wall 17 of which is seen, together with the wall 16, in FIGURE 3. The wall 17 has an integral circular periphery 18, to which the wall 16 is welded at 16A, so that the frame is an integer, with closely spaced walls. The walls 16, 17 are castings. FIGURE 2 shows the wall 16 stiffened by ribs 19 extending from its periphery to housings 20 for bearings 21 of the various shafts. The internal, i.e., left-hand, side of the wall 17 as seen in FIGURE 3 may be similarly stiffened by ribs.

The wall 17 has a flange 22, with bolt-holes 23, stiffened by ribs 24. The resilient moulding 6 fits round the flange 2 and thus provides for concentric mounting of the dished cover 4.

FIGURE 3, being a development, shows the complete train of four reduction stages from the shaft 11, used in this instance as the input shaft, to the output sleeve 1.

The shaft 11 emerges through an oil seal 25 in an aperture in a flat plastics-based cover 26 held parallel to the frame wall 17 by engagement in a groove 27 moulded inside the moulding 6. An oil seal 2A in an aperture in the cover 26 seals the end of the sleeve 1 that protrudes from the wall 17.

Instead of the shaft 11 as the input shaft, any one of the shafts 12, 13, 14 could be replaced by extended shafts, as shown at 12X, 13X, 14X, when the replacement shaft would serve as the input shaft, with corresponding operation of the box as three-stage, two-stage, or even single-stage reduction. Consequently, the one gear-box providing, in the 1:5 reduction at all stages of the present instance, reductions of 1:125, 1:25, or even 1:5, by simple replacement of any one shaft by an extended shaft. Of course, with any one stage thus eliminated, the shaft and gears of that stage could simply be omitted. Thus, were extending shaft 12X used for the input, the shaft 11 and its (integral) pinion 11B could be omitted, and there would be no need to fit the gear 12A to the shaft 12X.

FIGURE 3 shows how the walls 16, 17 are closely spaced, the distance between them being dictated by the tooth-width of the internal meshing pinion 13B and gear 14A. The internal meshing pinion 11B and gear 12A have a narrower tooth-width, because of their different, higher speed, duty, and therefore fit with space to spare between the walls. The external gear pairs 12B, 13A and 14B, 1A lie close against the wall 16, and are therefore stiffly supported by the respective shafts 12, 13, 14 and the sleeve 1. Extra support is provided for the sleeve 1 by protrusion of the housing 20 for its bearing 21 from the wall 16. The gears are therefore compactly housed inside and alongside the integral frame comprised by the walls 16, 17 and the periphery 18, and are stiffly supported by the shafts and the sleeves. This maintains accuracy of mesh and itself diminishes noise production.

When the frame 16, 17, 18 has been assembled into a light but strong integer by the single line of welding at 16A, the parallel boring of the housings 20 for the various bearings 21 is a simple machining operation, and only the right-hand side (FIGURE 3) of the wall 17 needs to be faced for the application of a retaining plate 28 for the retention of the bearings 21 in that wall. The location of the oil seals 2, 2A, 25 in the covers 4, 26 leaves the frame very simple and compact in form, to perform the primary duties of carrying the sleeve 1 and the shafts 11, 12, 13, 14 and of serving as a mounting for the moulding 6 and the two covers.

The carrying of the covers 4 and 26 solely by the resilient mouldings 6 damps transmission of noise to the covers from any of the gearing and the bearings. Except therefore unless acoustic or other considerations make the use of post-generated tooth finishing processes desirable, ordinary commercial cut spur gears, straight or helical, generally prove suitable for the transmission of loads at high speeds. For many purposes, spur gears are preferred, by their avoidance of the end thrust arising from the use of helical gears. The resilient mounting of the covers on the frame also protects the gears and bearings from damage if the gear-box receives any accidental blow.

The moulding 6 may also serve to carry the flat cover 26 in a manner that enables the moulding also to provide a resilient cushion for the use of the gear-box by flange-mounting. FIGURE 4 shows the flange 22 surrounded by the modified moulding 6a, and penetrated by bolts 29 that pass through the holes 23 in the flange and through the cover 26. The flange-mounting use of the moulding 6A will be described below with reference to FIGURE 5.

In FIGURE 5, the moulding 6A rests on a plate 26A forming part of a housing for a belt drive from a motor 34 mounted on the plate to the input shaft 11. The bolts 29 (only one shown) hold the frame 16, 17, 18 in resilient spaced relation from the plate 26A, which in this case provides one, generally flat cover, for the gear-box, the dished cover 4 being provided as before.

FIGURE 6 shows a gear-box essentially as that of

FIGURE 3, but providing for a maximum of three stages of reduction (and actually shown providing for two only), and otherwise modified. The frame walls 16, 17 are provided by a single casting, spaced by peripheral connections 18A. A resilient moulding 6B embraces the frame and presents two slots 27B to receive the edges of two identical dished covers 4A, the overall length of which corresponds to that of the output sleeve 1. The covers are drawn to the moulding by screws 38 that enter the ends of distance pieces 39 (one only shown) that pass through gaps (not shown) in the walls 16, 17. Circlips 40 retain the various bearings 21 in the housing 20 in the plate 17.

An extended shaft 13X is shown as providing the input to the gear-box. The reduction is by two stages, via the shaft 14 to the sleeve 1, by gear pairs 13B, 14A and 14B, 1A. Housings 20X are shown empty. If three-stage reduction were required, these would be occupied by bearings for an extended third shaft 12X, geared externally of the wall 16 to an unextended shaft 13.

Whether having provision for four shafts 11, 12, 13, 14 additionally to the output sleeve 1 (FIGURE 3), or for only three shafts (FIGURE 6), the frame 16, 17, 18 provides versatility of use, from a single reduction stage (shaft 12 input driving the sleeve 1 direct) or two or more reduction stages by using one or other of the further shafts as the input shaft.

FIGURE 5 shows that, instead of the two roller bearings 21 for the sleeve 1 in FIGURE 3, there may be provided a plain bearing bush 121 for the sleeve, retained by a circlip 122. Circlips may be used elsewhere for ease of assembly, e.g., the circlip 123 for one bearing 21 of the shaft 11.

In the cover plate 26 (FIGURE 3) or the dished cover 4A (FIGURE 6) through which the particular input shaft must pass, there may be an aperture for an oil seal 25 in alignment with each of the shafts, the apertures for all other than the shaft selected for input being blanked off by cover plates. Alternatively, different cover plates 26 or dished covers 4A may be made available, each with only one seal 25, located for alignment with the different shafts.

What I claim is:

1. A speed-reduction gearbox comprising a central frame having generally parallel walls, which are peripherally connected and are bored transversely, with parallel axes, to provide bearing housings (*a*) for an output sleeve by which the box can be mounted with respect to a shaft to be driven at reduced speed from an input shaft of the box (*b*) for a shaft, which can serve as an input shaft, in driving connection with the sleeve through an output stage of speed-reduction provided by a pair of gears carried, externally of the frame, by the shaft and the sleeve respectively and (*c*) for the reception of one or more further shafts to provide for one or more further stages of speed-reduction in series with the output stage, with the number of shafts necessary for the desired number of stages interconnected from the sleeve to whichever shaft serves as the input shaft by pairs of gears that are in turn external of the frame and internal of it, the respective axes of the two or more pairs of bearing housings for the shafts being spaced substantially equally from the axis of the sleeve, the frame having means for anchoring the gearbox when mounted, a resilient moulding carried by the periphery of the central frame, and a pair of covers of sound deadening material both supported from said frame solely by means of said moulding.

2. A gearbox as in claim 1, wherein the resilient moulding is provided with circular slots to receive the edges of said covers, each said cover enclosing one side of the box.

3. A gearbox as in claim 1, which includes two circular dished covers, and wherein the resilient moulding is provided with oppositely directed circular slots to receive the respective edges of said two dished covers, said covers enclosing opposite sides of the box.

4. A gearbox as in claim 1, wherein the central frame is provided with at least one projection that extends through the resilient moulding for the attachment of the frame to an anchoring point when the gearbox is shaft-mounted and is formed with bolt-holes to provide alternative flange mounting of the gearbox.

5. A gearbox as in claim 1, wherein the resilient moulding is of rubber.

References Cited
UNITED STATES PATENTS

| | | | |
|---|---|---|---|
| 2,295,965 | 9/1942 | Pierce | 230—233 X |
| 2,596,794 | 5/1952 | Schmitter | 74—421 |
| 2,627,936 | 2/1953 | Martinet | 230—233 X |
| 2,762,232 | 9/1956 | Bade | 74—421 |
| 2,801,548 | 8/1957 | Bade | 74—421 |
| 2,835,138 | 5/1958 | Het et al. | 74—421 |
| 2,950,628 | 8/1960 | Bade | 74—421 |

FRED C. MATTERN, Jr., *Primary Examiner.*

DAVID J. WILLIAMOWSKY, *Examiner.*

C. J. HUSAR, *Assistant Examiner.*